(12) United States Patent
Ward

(10) Patent No.: US 6,203,232 B1
(45) Date of Patent: Mar. 20, 2001

(54) CALIBRATED GUSSET PLATE

(76) Inventor: Robert L. Ward, 9325 Castlebrook, Shreveport, LA (US) 71129

( * ) Notice: Subject to any disclaimer, the term of this patent is extended or adjusted under 35 U.S.C. 154(b) by 0 days.

(21) Appl. No.: 08/317,355

(22) Filed: Oct. 4, 1994

(51) Int. Cl.$^7$ .............................. F16B 5/00; F16B 15/00
(52) U.S. Cl. .......................... 403/14; 403/283; 52/712; 52/DIG. 6; 411/461; 411/466
(58) Field of Search ................... 403/283, 405.1, 403/403, 232.1, 29, 13, 14, 230, 293, 406.1, 407.1; 52/642, DIG. 6, 639, 726.2, 712; 411/461, 462, 463, 464, 465, 466, 467, 468; 248/300

(56) References Cited

U.S. PATENT DOCUMENTS

| | | | |
|---|---|---|---|
| 1,703,522 | * 2/1929 | Escobales | 411/467 |
| 2,117,308 | * 5/1938 | Frey | 411/461 |
| 2,402,337 | * 6/1946 | McWilliams | 248/300 |
| 2,638,643 | * 5/1953 | Olson | 248/300 X |
| 3,258,282 | * 6/1966 | Koenigshof | 403/406.1 X |
| 3,377,905 | * 4/1968 | McAlpine | 411/468 |
| 3,529,918 | * 9/1970 | Jureit | 411/466 |
| 3,596,941 | * 8/1971 | Tracy | 403/232.1 X |
| 3,963,452 | 6/1976 | Jureit et al. | 206/343 |
| 3,985,459 | * 10/1976 | Gilb | 52/639 X |
| 4,084,778 | * 4/1978 | Dominguez | 248/300 X |
| 4,198,175 | * 4/1980 | Knepp et al. | 403/232.1 X |
| 4,275,854 | 6/1981 | Jureit et al. | 242/55 |
| 4,572,695 | * 2/1986 | Gilb | 403/14 X |
| 4,639,176 | * 1/1987 | Smith et al. | 403/405.1 X |
| 4,737,060 | * 4/1988 | Birckybad | 44/468 |
| 4,782,641 | * 11/1988 | Manenti et al. | 52/639 |
| 5,341,619 | * 8/1994 | Dunagan et al. | 403/232.1 X |
| 5,457,928 | * 10/1995 | Sahnazarian | 403/403 X |

FOREIGN PATENT DOCUMENTS

| | | | |
|---|---|---|---|
| 929932 | * 1/1948 | (FR) | 52/DIG. 6 |
| 2330816 | * 6/1977 | (FR) | 57/712 |

* cited by examiner

Primary Examiner—Harry C. Kim
(74) Attorney, Agent, or Firm—Howard & Howard

(57) ABSTRACT

A calibrated gusset plate for joining a pair of abutting wooden members in the construction of roof trusses, floor or ceiling joists and the like. In a preferred embodiment the calibrated gusset plate is characterized by a rectangular sheet metal gusset plate stock having multiple prongs which are struck from the gusset plate stock and projected to one side thereof in a series of longitudinally-extending rows. A calibrating mark such as a notch is formed in the mid-point of each longitudinal edge and each transverse edge of the gusset plate for alignment with the abutting surfaces of a pair of wooden truss members which are to be joined by the calibrated gusset plate. In another embodiment, a calibrating bead projects from the gusset plate on the side of the prongs at the mid-point of each longitudinal edge and at the mid-point of each transverse edge of the gusset plate. In still another embodiment, a scribe is formed in the gusset plate, at the mid-point of each longitudinal and transverse edge of the gusset plate. An in yet another embodiment, a calibrating aperture or opening is provided in the gusset plate, at the mid-point of each longitudinal and transverse edge thereof.

14 Claims, 4 Drawing Sheets

US 6,203,232 B1

CALIBRATED GUSSET PLATE

BACKGROUND OF THE INVENTION

Field of the Invention

This invention relates to gusset plates for joining abutting wooden members in the construction of roof trusses, floor or ceiling joists and the like and more particularly, to a calibrated gusset plate having a calibration at the mid-point of each longitudinal edge and each transverse edge of the gusset plate to facilitate equal distribution of each wooden member on the gusset plate. In a preferred embodiment of the invention, the calibrated gusset plate is characterized by a rectangular gusset plate stock which is constructed of sheet metal and includes multiple prongs or teeth which are struck from the plate and project to one side thereof in a series of perpendicular, longitudinally-extending rows. In a preferred embodiment a calibrating notch is formed in the gusset plate at substantially the mid-point of the longitudinal edge and transverse edge of the gusset plate for alignment with the abutting edges of the wooden members to be connected by the gusset plate. In another embodiment, a bead projects from the mid-point of each longitudinal edge and each transverse edge of the calibrating gusset plate. In still another embodiment, a calibrating scribe is formed in the gusset plate at the mid-point of each longitudinal and transverse edge thereof, and in yet another embodiment a calibrated aperture or opening is formed at the mid-point of each longitudinal and transverse edge of the calibrating gusset plate.

One of the problems frequently encountered in using conventional gusset plates to join a pair of abutting wooden members in the construction of roof trusses, floor and ceiling joists and the like is the difficulty in achieving an even distribution of the area of the gusset plate on each of the two wooden members which are to be joined by the gusset plate. This is difficult since the worker positioning the gusset plates on the wooden truss members typically does so with one of each pair of gusset plates underlying the wooden members. The calibrated gusset plate of this invention is characterized by a calibrating notch, bead, scribe or aperture formed in the gusset plate at the mid-point of each longitudinal edge or each transverse edge, or both, of the gusset plate. The calibrations allow the worker to align the calibrations in the gusset plate with the junction of the wooden truss members to be connected, in order to achieve an equal area of distribution of the gusset plate on each of the wooden members.

DESCRIPTION OF THE PRIOR ART

Various plates or struts having prongs or teeth extending from one surface thereof are known in the art for connecting a pair of abutting wooden members in the construction of roof trusses and the like. U.S. Pat. No. 2,117,308, dated May 17, 1938, to Frank W. Frey, describes a "Connector" characterized by a metallic strip having multiple piercing elements projecting perpendicularly from each end of the strip portion. The connector is driven into a pair of abutting wooden members to hold the wooden members together. U.S. Pat. No. 3,963,452, dated Jun. 15, 1976, to John Calvin Jureit and Gerald E. Robey, discloses a "Connector Plate Stock" characterized by a sheet metal plate having multiple elongated, nail-like teeth struck from the plate and projecting to one side thereof in a series of longitudinally-extending rows. Repetitive scorelines are formed in the stock plate, thus identifying multiple discrete connector plates and also to define weakened portions along the stock plate between adjacent discrete connector plates, such that the respective connector plates in the stock plate are separable from one another and from the stock plate. U.S. Pat. No. 4,275,854, dated Jun. 30, 1981, to Calvin Jureit, etal, details "Rolled Nail Strips Packed Without Spools" for joining wooden members. The nail strips are characterized by a plate of sheet metal having integrally struck teeth projecting from one side. The wooden members are placed between first and second press heads and a coiled composite of connector plate stock has first and second lengths of connector stock in juxta position with intermeshing teeth. The first and second lengths of connector stock are unwound separately and oriented so that the teeth thereof point toward the wooden members to be joined. A cutting mechanism associated with the pressheads then cuts connector plates from the stock and the plates are positioned on opposite sides of the wooden members and at the junctures to be joined. The pressheads then press the plates into the wooden members.

It is an object of this invention to provide a calibrated gusset plate for joining a pair of wooden members in the construction of roof trusses, ceiling and floor joists and the like (hereinafter called wooden truss members).

Another object of this invention is to provide a calibrated gusset plate having multiple elongated prongs struck from a sheet metal plate and projecting to one side of the plate for penetrating each of two abutting wooden truss members and joining the wooden truss members in the construction of roof trusses, ceiling joists, floor joists and the like.

Still another object of this invention is to provide a calibrated gusset plate characterized by a square or rectangular sheet metal plate having multiple elongated prongs struck from the plate and extending to one side thereof and having a calibrated notch formed in the plate at the mid-point of each longitudinal edge and/or transverse edge of the plate, to facilitate alignment of the calibrating notches with the abutting surfaces of wooden truss members to be connected, in order to achieve a like area of distribution of the calibrated gusset plate on each of the two wooden truss members.

Yet another object of this invention is to provide a calibrated gusset plate having a calibrated bead projecting from the gusset plate at the mid-point of each longitudinal and/or transverse edge of the gusset plate for alignment with the abutting surfaces of the wooden truss members to be joined, to achieve like area of distribution of the gusset plate on each of the wooden truss members.

A still further object of this invention is to provide a calibrated gusset plate having calibrating scribes pressed in the gusset plate at the mid-point of each longitudinal edge and/or transverse edge of the gusset plate to facilitate a like area of distribution of the calibrated gusset plate on each of the two wooden truss members to be joined, prior to pressing the calibrated gusset plate into each of the wooden truss members.

Another object of this invention is to provide a calibrated gusset plate having calibrating apertures formed at the mid-point of each longitudinal edge and/or transverse edge of the calibrated gusset plate to facilitate a like area of distribution of the gusset plate on each of the two wooden truss members to be joined before pressing the calibrated gusset plate into the wooden truss members.

SUMMARY OF THE INVENTION

These and other objects of the invention are provided in a calibrated gusset plate characterized by a rectangular sheet metal plate having multiple elongated prongs or teeth struck therefrom to project to one side of in a series of longitudinally-extending rows, for joining a pair of abutting wooden truss members in the construction of a roof truss, ceiling joist, floor joist or the like. In a preferred embodiment the calibrating gusset plate includes a calibrating notch formed in substantially the mid-point of each longitudinal edge and/or each transverse edge of the calibrated gusset plate for alignment with the abutting surfaces of the wooden truss members in order to achieve an even or like area of distribution of the calibrated gusset plate on each of the two wooden truss members prior to pressing the calibrated gusset plate into the wooden truss members. In another embodiment, the calibrated gusset plate includes calibrating beads projecting from substantially the mid-point of each longitudinal edge and/or each transverse edge of the gusset plate, or both, to facilitate proper alignment and distribution of the gusset plate on each of the two wooden truss members. In still another embodiment, a calibrating scribe is pressed in the gusset plate at substantially the mid-point of each longitudinal edge or each transverse edge of the calibrated gusset plate, or both, and in still another embodiment, a calibrating aperture is formed in the calibrated gusset plate at substantially the mid-point of each longitudinal edge and/or transverse edge of the gusset plate.

BRIEF DESCRIPTION OF THE DRAWINGS

The invention will be better understood by reference to the accompanying drawings, wherein.

DESCRIPTION OF THE PREFERRED EMBODIMENTS

Figure 1:
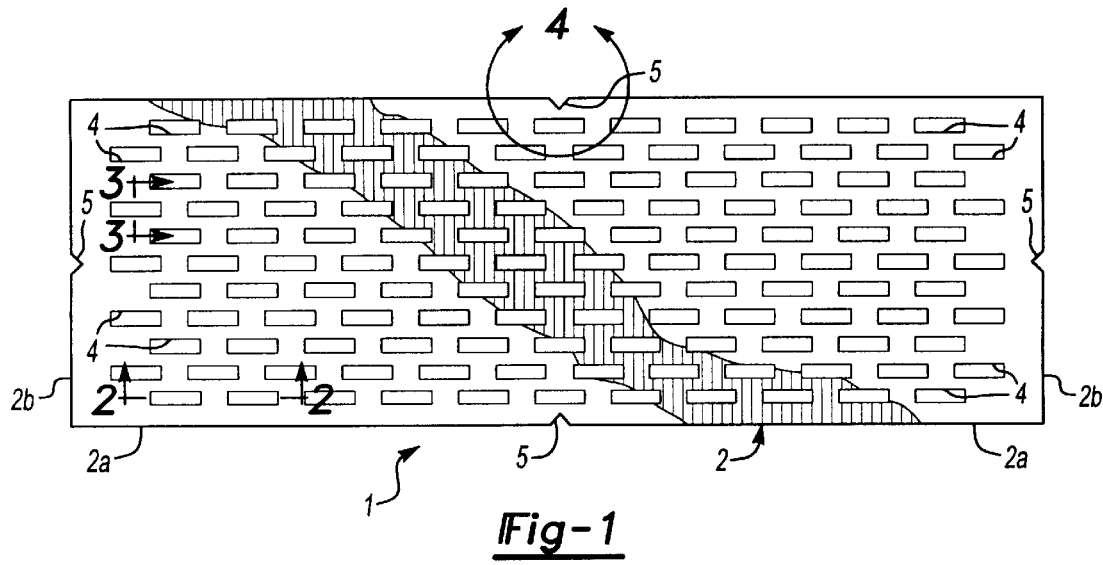
FIG. 1 is a top view of a calibrating notch embodiment of the calibrated gusset plate of this invention.
Figure 2:
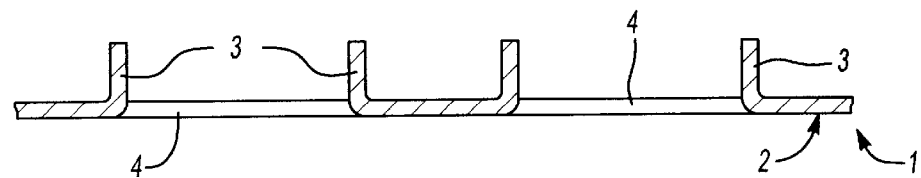
FIG. 2 is a side view, partially in section, of the calibrated gusset plate.
Figure 3:
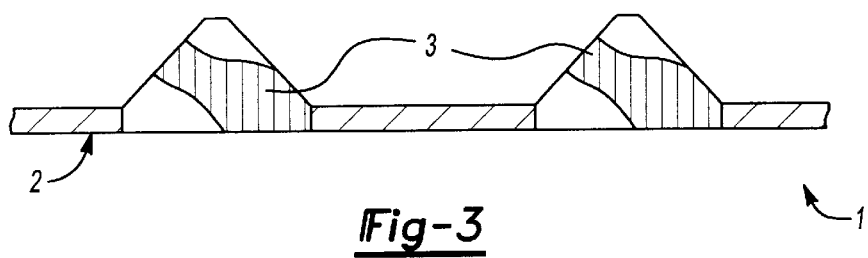
FIG. 3 is an end view, partially in section, of the calibrated gusset plate.
Figure 4:
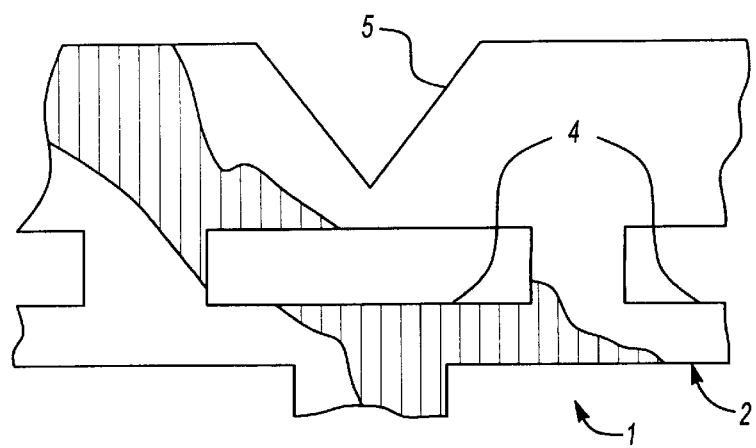
FIG. 4 is an enlarged view of a calibrating notch embodiment of the calibrated gusset plate.
Figure 5:
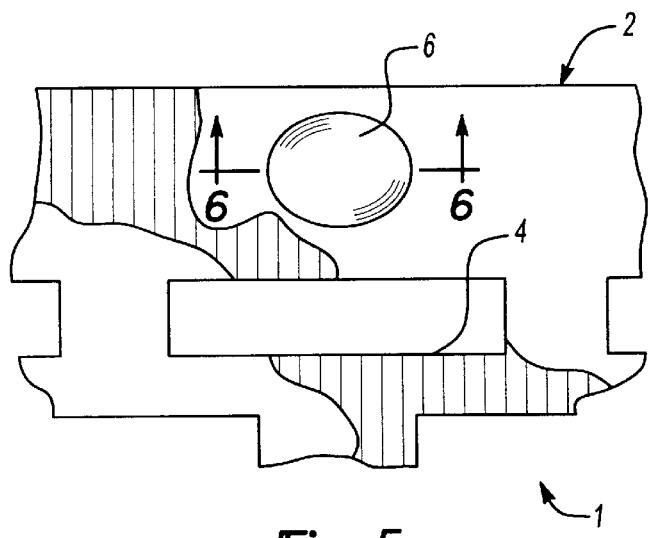
FIG. 5 is an enlarged view of a calibrating bead embodiment of the calibrated gusset plate.

Referring initially to FIGS. 1–4 and 12–14 of the drawings, in a first preferred embodiment the calibrated gusset plate of this invention is generally illustrated by reference 1. The calibrated gusset plate 1 is typically constructed of a sheet metal plate 2 having a rectangular configuration. Multiple, elongated, tapered teeth or prongs 3 are struck from the sheet plate 2 and extend perpendicularly to one side thereof, forming multiple prong slots 4 arranged in a series of longitudinally-extending rows in the sheet metal plate 2, as illustrated in FIGS. 1–4. A V-shaped calibrating notch 5 is formed in the sheet metal plate 2 of the calibrated gusset plate 1 at substantially the mid-point of each longitudinal edge 2a and each transverse edge 2b thereof, as illustrated in FIGS. 1 and 4.

Figure 12:
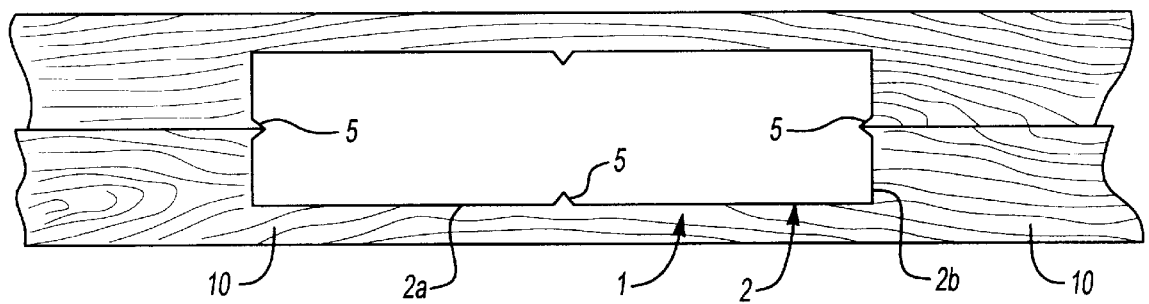
FIG. 12 is a top view of a calibrated gusset plate joining vertically aligned wooden truss members.
Figure 13:
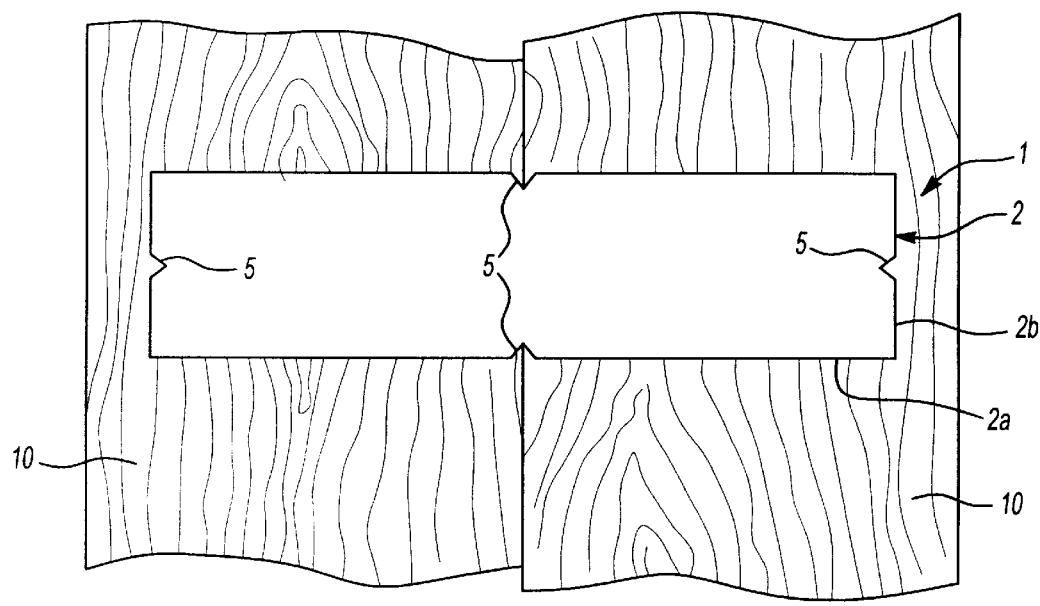
FIG. 13 is a top view of a calibrated gusset plate joining horizontally aligned wooden truss members.
Figure 14:
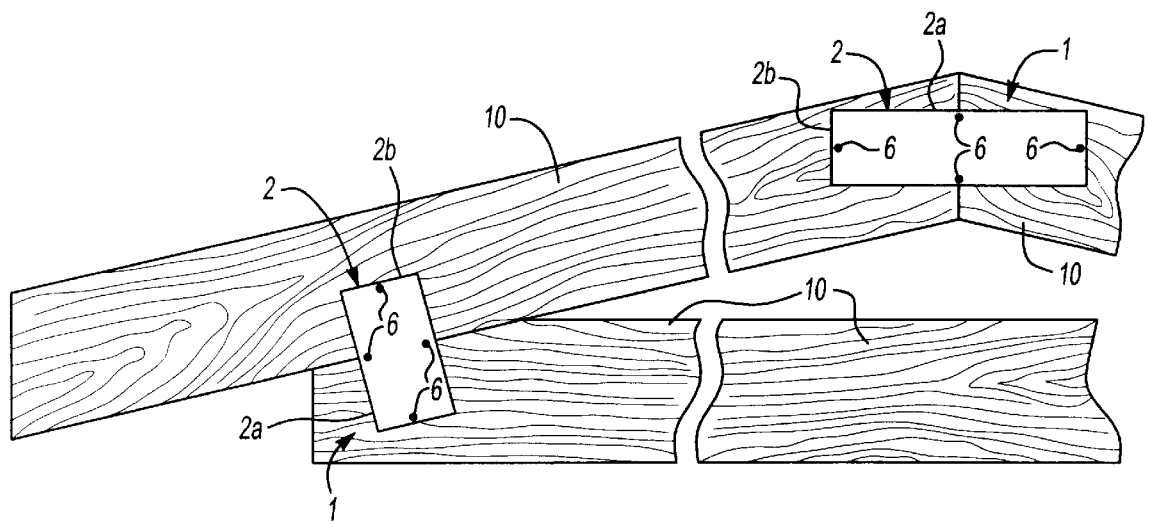
FIG. 14 is a top view of a calibrated gusset plate joining wooden roof truss members.

The calibrated gusset plate 1 is designed as one of a pair to connect a pair of abutting wooden truss members 10 (illustrated in in FIGS. 12–14) in horizontal adjacent fashion with respect to each other, as illustrated in FIG. 12, in perpendicular adjacent relationship as illustrated in FIG. 13, and in angular relationship in a wooden roof truss, as illustrated in FIG. 14. Each one of several sheet metal plates 2 of the calibrated gusset plate 1 are first positioned on a flat jig table (not illustrated) with the teeth or prongs 3 facing upwardly. For example, one of the wooden truss members 10 illustrated in FIG. 12 is placed longitudinally and horizontally on one-half of the prongs 3, with a longitudinal edge of the wooden truss member 10 aligned with the calibrating notches 5 formed in each transverse edge 2b of the sheet metal plate 2. A second wooden truss member 10 is then positioned longitudinally and horizontally on the remaining half of the sheet metal plate 2, with a horizontal edge abutting the first wooden truss member 10 and also aligned with the calibrating notches 5 formed in the transverse edges 2b of the sheet metal plate 2. A second set of calibrated gusset plates 1 are then positioned on top of the horizontally abutting wooden truss members 10, with the sheet metal plates 2 aligned as illustrated in FIG. 12, such that the calibrating notches 5 coincide with the horizontal edges of the respective wooden truss members 10. A suitable press is then operated to press the prongs 3 of the pairs of calibrated gusset plate 1 into both sides of the wooden members 10 and securely fasten the wooden truss members 10 to each other. Vertical abutting wooden truss members 10 are similarly connected by a pair of calibrated gusset plates 10, as illustrated in FIG. 13.

Figure 6:
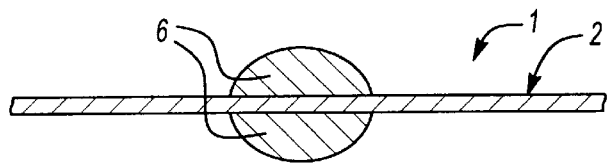
FIG. 6 is a sectional view taken along line 6—6 of the calibrating bead embodiment illustrated in FIG. 5.
Figure 7:
FIG. 7 is a sectional view of an alternative calibrating bead configuration.

Referring now to FIGS. 5–7 and 14 of the drawings, in a second preferred embodiment of the invention the sheet metal plate 2 of the calibrated gusset plate 1 includes a calibrating bead 6 projecting from the bottom and top surfaces of the calibrated gusset plate 1, as illustrated in FIG. 6, or from the top surface only, as illustrated in FIG. 7, at substantially the mid-point of each longitudinal edge 2a of the sheet metal plate 2 and substantially the mid-point of each transverse edge 2b thereof. As described with respect to the calibrating notches 5 embodiment described above, a first bottom sheet metal plate 2 of the calibrated gusset plate 1 is first positioned on a jig table and a first wooden truss member 10 is placed angularly across one-half of the teeth or prongs 3 of the sheet metal plate 2, with a vertical cut edge of the wooden truss member 10 aligned with the calibrating beads 6 included at the mid-point of the longitudinal edges 2a of the sheet metal plate 2. The second wooden truss member 10 is then placed across the remaining half of the sheet metal plate 2, with the vertical cut edge of the second wooden truss member 10 abutting the longitudinal edge of the first wooden truss member 10 and aligned with the same calibrating beads 6. A second calibrated gusset plate 1 is then positioned on the top sides of the wooden truss members 10, with the vertical cut edges of the wooden truss members 10 aligned with the corresponding calibrating beads 6 in the longitudinal edges 2a of the sheet metal plate 2 of the top calibrated gusset plate 1. A second set of calibrated gusset plates 1 is also positioned on a pair of wooden truss members 10 as further illustrated in FIG. 14 and the respective prongs 3 of the calibrated gusset plates 1 are then pressed into the respective wooden truss members 10 to join the wooden truss members 10.

Figure 8:
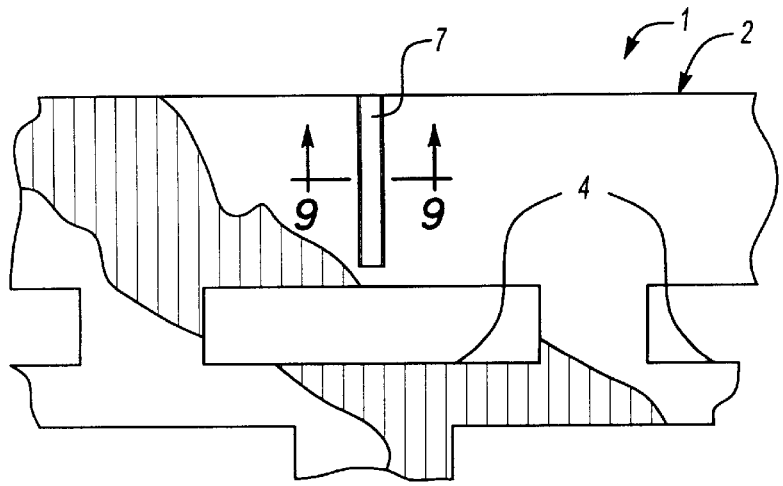
FIG. 8 is an enlarged view of a calibrating scribe embodiment of the calibrated gusset plate.
Figure 9:
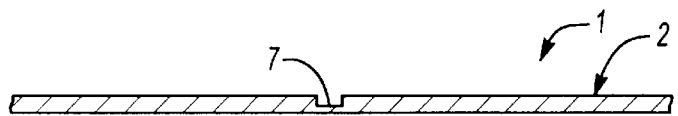
FIG. 9 is a sectional view taken along line 9—9 of the calibrating scribe embodiment of FIG. 8.

Referring now to FIGS. 8 and 9 of the drawings, in a third preferred embodiment the sheet metal plate 2 is characterized by a calibrating scribe 7 which is pressed or scratched into the sheet metal plate 2 at substantially the mid-point of each longitudinal and transverse edge thereof, on both sides of the sheet metal plate 2. The calibrating scribes 7 are used to align the top and bottom sets of the calibrated gusset plates 1 with various wooden truss members 10 as described above, to properly position the wooden truss members 10 on the jig table prior to pressing the prongs 3 into the wooden members 10.

Figure 10:
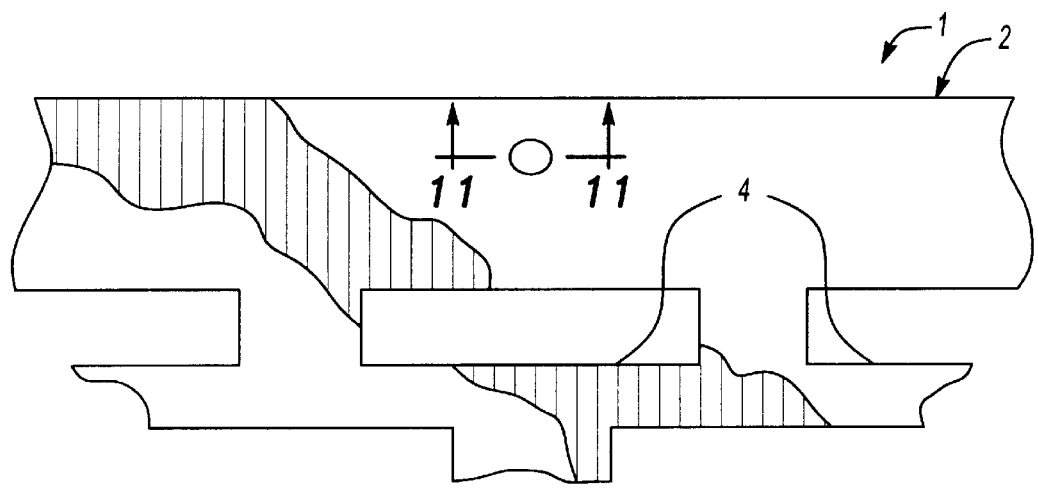
FIG. 10 is an enlarged view of a calibrating aperture embodiment of the calibrated gusset plate.
Figure 11:
FIG. 11 is a sectional view taken along line 11—11 of the calibrating aperture embodiment of FIG. 10.

Referring now to FIGS. 10 and 11 of the drawings, in a fourth preferred embodiment of the invention, each connecting pair of the calibrated gusset plates 1 is characterized by a sheet metal plate 2 having calibrated apertures 8 located at substantially the midpoint of each longitudinal and transverse edge thereof, for properly positioning each of two wooden truss members 10 on the sheet metal plates 2 in pairs, prior to connecting the two wooden truss members 10 as described above.

While the preferred embodiments of the invention have been described above it will be recognized and understood that various modifications may be made within the invention and the appended claims are intended to cover all such modifications which may fall within the spirit and scope of the invention.

Having described my invention with the particularity set forth above, what is claimed is:

1. A structural assembly, comprising:
   at least two wooden structural members abutting at a joint having abutting surfaces defining a generally linear interface between said structural members, and
   a calibrated gusset plate having a generally planar body portion and a plurality of teeth extending generally perpendicular to said body portion, said gusset plate body portion having alignment indicia at mid points of at least four opposed edges of said body portion,
   said gusset plate body portion generally equally spanning said structural members with said indicia aligned with said linear interface between said structural members and said teeth penetrating said structural members forming a rigid structural assembly.

2. A structural assembly as recited in claim 1, wherein said body portion is generally rectangular and has only said four edges.

3. A structural assembly as recited in claim 2, wherein only two of said alignment indicia being aligned on said joint.

4. A structural assembly as recited in claim 1, wherein said alignment indicia is a notch extending inwardly from said edge.

5. A structural assembly as recited in claim 1, wherein said alignment indicia is a bead extending upwardly from a face of said body portion in a direction opposed to the direction with which said teeth extend from said body portion.

6. A structural assembly as recited in claim 1, wherein said alignment indicia is a scribe formed at said edge.

7. A structural assembly as recited in claim 1, wherein said alignment indicia is an opening formed at a location spaced inwardly from said edge.

8. A structural assembly as recited in claim 1, wherein said wooden members are a portion of a truss.

9. A structural assembly, comprising:
   at least two wooden structural members abutting at a joint having abutting surfaces defining a generally linear interface between said structural members,
   a calibrated gusset plate having a generally rectangular planar plate body portion defining four edges and a plurality of teeth extending generally perpendicular from said body portion, said gusset plate body portion having two pairs of alignment indicia adjacent the mid-portion of said edges of said body portion, including a first of said pairs of indicia on opposed edges of said body portion and a second pair of indicia on the remaining opposed edges of said body portion, said pairs of indicia arranged such that a line drawn between said pairs of indicia intersect at generally right angles,
   said gusset plate body portion generally equally spanning said wooden structural members with one of said pair of indicia aligned with said linear interface between said structural members and said teeth penetrating said structural members forming a rigid structural assembly.

10. A structural assembly as recited in claim 9, wherein said alignment indicia is a notch extending inwardly from said edge.

11. A structural assembly as recited in claim 9, wherein said alignment indicia is a bead extending upwardly from a face of said plate body portion in a direction opposed to the direction with which said teeth extend from said plate body portion.

12. A structural assembly as recited in claim 9, wherein said alignment indicia is a scribe formed at said edge.

13. A structural assembly as recited in claim 9, wherein said alignment indicia is an opening formed at a location spaced inwardly from said edge.

14. A structural assembly as recited in claim 9, wherein said wooden members are a portion of a truss.

* * * * *